US010390471B2

United States Patent
Bruce (10) Patent No.: US 10,390,471 B2
(45) Date of Patent: Aug. 27, 2019

(54) AGRICULTURAL DRILL/PLANTER/COULTER/DISC BLADE WITH SINE WAVE EDGE

(71) Applicant: Douglas G. Bruce, West Des Moines, IA (US)

(72) Inventor: Douglas G. Bruce, West Des Moines, IA (US)

( * ) Notice: Subject to any disclaimer, the term of this patent is extended or adjusted under 35 U.S.C. 154(b) by 620 days.

(21) Appl. No.: 14/324,451

(22) Filed: Jul. 7, 2014

(65) Prior Publication Data

US 2016/0000001 A1    Jan. 7, 2016

(51) Int. Cl.
| | | |
|---|---|---|
| A01B 15/16 | (2006.01) | |
| A01B 23/06 | (2006.01) | |
| A01C 5/06 | (2006.01) | |

(52) U.S. Cl.
CPC ............. *A01B 15/16* (2013.01); *A01B 23/06* (2013.01); *A01C 5/064* (2013.01)

(58) Field of Classification Search
CPC ......... A01B 15/16; A01B 15/18; A01B 21/08; A01B 23/06; A01C 5/064
See application file for complete search history.

(56) References Cited

U.S. PATENT DOCUMENTS

| | | | | | |
|---|---|---|---|---|---|
| 323,343 | A | * | 7/1885 | La Dow | .................. A01B 23/06 172/566 |
| 323,344 | A | * | 7/1885 | La Dow | .................. A01B 21/08 172/579 |
| 672,536 | A | * | 4/1901 | Newton | .................. A01B 23/06 172/604 |
| 1,526,586 | A | * | 2/1925 | Becker | .................... A01B 39/26 172/510 |
| 1,554,202 | A | * | 9/1925 | Diehl | ........................ A01G 3/06 172/16 |
| 2,269,051 | A | | 1/1942 | Cahoy | |
| 3,213,514 | A | * | 10/1965 | Evans | .................... A01B 23/06 172/555 |
| 4,099,576 | A | | 7/1978 | Jilani | |
| 4,131,162 | A | | 12/1978 | Schmitz | |
| 4,250,968 | A | | 2/1981 | Fox | |
| 4,538,688 | A | * | 9/1985 | Szucs | ..................... A01B 15/18 172/555 |
| 4,591,002 | A | * | 5/1986 | Meinert | ................. A01B 39/26 172/456 |

(Continued)

FOREIGN PATENT DOCUMENTS

| | | |
|---|---|---|
| AU | 200072264 | 2/2002 |
| CA | 2181311 | 7/1997 |

(Continued)

OTHER PUBLICATIONS 8 pages, from a website showing Forges Deniaux.Fr. discs.

(Continued)

*Primary Examiner* — Jessica H Lutz
(74) *Attorney, Agent, or Firm* — Jordan Meggison-Decker; BrownWinick Law Firm (57) ABSTRACT

An agricultural tillage blade having a central opening is adapted to be disposed on a shaft for rotation to cut trash and penetrate into the soil. The blade has an outer periphery substantially in the shape of a sine curve formed about a circle. The outer periphery of the blade is sharpened to more easily penetrate the soil and cut trash.

26 Claims, 9 Drawing Sheets

(56) References Cited

U.S. PATENT DOCUMENTS

| | | | |
|---|---|---|---|
| 4,598,654 A * | 7/1986 | Robertson | A01C 7/201 |
| | | | 111/165 |
| 5,167,286 A | 12/1992 | Bossler | |
| 5,458,203 A * | 10/1995 | Evers | A01B 21/08 |
| | | | 172/569 |
| 5,495,897 A | 3/1996 | Javerlhac | |
| 5,620,055 A | 4/1997 | Javerlhac | |
| 5,649,602 A | 7/1997 | Bruce | |
| 5,816,340 A * | 10/1998 | Cox | A01B 35/18 |
| | | | 172/508 |
| 5,875,855 A * | 3/1999 | Bruns | A01B 39/08 |
| | | | 172/508 |
| 6,554,079 B2 | 4/2003 | Bruce | |
| 6,752,095 B1 | 6/2004 | Rylander | |
| 6,968,907 B1 * | 11/2005 | Raper | A01B 29/045 |
| | | | 172/518 |
| 7,143,838 B2 | 12/2006 | Piccat | |
| 7,497,270 B2 | 3/2009 | Bruce | |
| 7,717,048 B2 | 5/2010 | Peterson | |
| 7,874,376 B2 | 1/2011 | Piccat | |
| 7,878,262 B1 | 2/2011 | Bruce | |
| 7,992,651 B2 | 8/2011 | Bruce | |
| 8,746,361 B2 | 6/2014 | Hake et al. | |
| 2008/0295750 A1 * | 12/2008 | Gregor | A01B 35/16 |
| | | | 111/164 |
| 2010/0147541 A1 * | 6/2010 | Piccat | A01B 23/06 |
| | | | 172/604 |
| 2011/0162856 A1 | 7/2011 | Bruce | |
| 2011/0240319 A1 * | 10/2011 | Sanderson | A01B 23/06 |
| | | | 172/604 |
| 2014/0251192 A1 | 9/2014 | Dietrich, Sr. et al. | |
| 2015/0034344 A1 * | 2/2015 | Bruce | B24B 3/466 |
| | | | 172/604 |
| 2015/0289433 A1 * | 10/2015 | Sanderson | A01B 23/06 |
| | | | 172/604 |

FOREIGN PATENT DOCUMENTS

| | | |
|---|---|---|
| CA | 2561846 | 2/2008 |
| CA | 2688519 | 6/2010 |
| FR | 2444395 | 7/1980 |
| WO | 2014165648 | 10/2014 |
| WO | 2015016953 | 2/2015 |
| WO | PCT/US2015/039043 | 7/2015 |
| WO | 2016111907 | 7/2016 |

OTHER PUBLICATIONS 6 pages—entitled Terminology for Soil-Engaging Components for Conservation—Tillage Planters, Drills, and Seeders from ASAE Standards—2002 (Dec. 2001).

13 pages—entitled "Terminology and Definitions for Agricultural Tillage Implements"—American Society of Agricultural Engineers—ASAE S414.1—Feb. 2004.

8 pages—Notification of Transmittal of the Int'l Search Report and the Written Opinion of the Int'l Searching Authority, or the Declaration—from corresponding PCT application.

* cited by examiner

Fig. 7A   Fig. 7B
Alternate

AGRICULTURAL DRILL/PLANTER/COULTER/DISC BLADE WITH SINE WAVE EDGE

TECHNICAL FIELD

This invention relates generally to an improved ground engaging blade for an agricultural implement such as a tillage disc or coulter, drill or planter and more particularly to such a blade that, due to its shape, will penetrate the soil and cut trash better than prior art blades.

BACKGROUND

A first category of replaceable blades for agricultural use such as disc blades, coulter blades and planter blades often have a circular sharpened outer periphery. These blades that are typically rotatably mounted on a shaft and they rotate about the shaft due to contact with the soil as the implement moves over the top of the ground. U.S. Pat. No. 5,167,286 to Bossier shows gangs of discs of this type. Because of the circular shape, there is slippage between the blade and the ground as the blade is towed through a field, meaning essentially that the rotation of the blade is not constant even when the frame to which the shaft is attached is moving constantly in a forward direction. This slippage causes the blades to not cut the trash in a consistent manner. As the blade slips, trash will build up in front of the blade before the blade goes over the trash to cut it. This results in incomplete and inconsistent cutting of the trash.

A second category of replaceable blades of the aforementioned type have notches, flutes or waves which cause the blade to constantly rotate without slipping as the implement to which they are attached moves forwardly over the surface of the ground. Cutting surfaces on the outer periphery of notched blades are usually not sharp inside the notches, but only on the original circular portion of these blades before the notches have been cut out from them. In those blades, such as those shown in U.S. Pat. No. 6,554,079 to Bruce, trash is trapped in the notches but the notched portions do not always cleanly cut the trash though the notched portions of the blades may tear the trash into pieces to some extent.

Even if the notched portions of the notched blades were to be sharpened, for example as shown in U.S. Pat. No. 2,369,051 to Cahoy, an irregular pattern in the cutting edge results in inconsistent cutting of the trash.

Fluted and wavy coulters or discs, for example as shown in U.S. Pat. No. 5,649,602 to Bruce, has an outer peripheral cutting surface that is formed on the blade when it is circular and then the waves are formed into the blade during a hot forming step, making the cutting surfaces still close to being formed along a circular path that is moves from one side and then to the other side from a plane perpendicular to the axis of rotation of the blade. So there is very little trapping of trash between one wave of the outer periphery and the next adjacent one as the blade rotates and passes through the soil. This is in contrast to the aforementioned notched blades that trap trash in the notches as the blade rotates through the soil.

U.S. Pat. No. 5,495,897 to Javerlhac has a clover leaf like design that is mounted on a shaft. A disc set 31 is seen in FIG. 8 of Javerlhac is mounted fixed to a shaft for rotation with the shaft. The blades do not rotate on the shaft independently of each other. The Javerlhac blades are out of phase so Javerlhac's device will work like a plow in that the lobes of one disk throw dirt to the next adjacent one sequentially. The blades 5 of U.S. Pat. No. 2,369,051 to Cahoy similarly rotate with the shaft on which they are mounted and do not rotate on the shaft independently with other blades that are disposed for rotation independently on the same shaft. Consequently blades like those of Javerlhac and Cahoy that are designed to rotate with the shaft with other similar blades out of phase rotating on the same shaft fall into a third category of blades.

Planter blades are used on a planter or drill for cutting a slot in the ground and are also used to open a furrow so that seeds may be dropped in the furrow before the seeds are then covered up by closing the furrow and packing down the soil over the seeds. These planter blades, for example as shown in U.S. Patent No. 6,752,095 to Rylander et al., are typically just a round flat steel disc with a sharpened outer peripheral edge, but it is extremely important that each planter blade penetrate the ground and cut trash if trash is in the path of the planter blade. It is critical that trash not build up in front of a planter blade, which is prone to happen when that blade has a typical prior art type circular outer periphery cutting surface on it. All of the aforementioned patents are hereby incorporated herein by reference in their entirety.

Accordingly, there is a need for a disc, coulter or planter blade that cuts trash and penetrates the soil better than those available in the past.

SUMMARY OF THE INVENTION

The present invention relates to an improved agricultural disc, coulter, planter/drill blade with an outer periphery substantially in the shape of a sine wave disposed about a circle.

The blades of the present invention will penetrate the soil farther, while at the same time, trapping trash in the depressions of the blade so as to cut trash better than previously known blades of this type.

BRIEF DESCRIPTION OF THE DRAWINGS

The above needs are at least partially met through provision of the apparatus described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
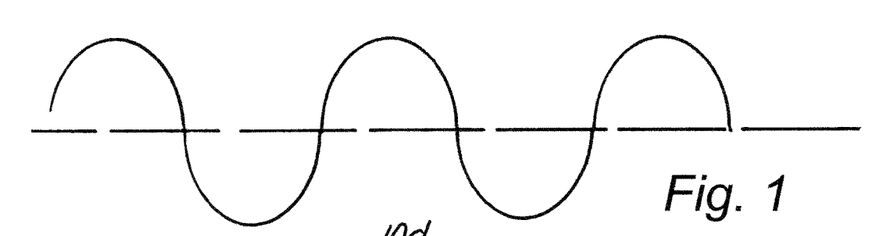
FIG. 1 is a sine wave/curve disposed along a straight line.

Referring now to the drawings, wherein like reference numerals indicate identical or similar parts throughout the several views, FIG. 1 shows a sine wave formed along a horizontal line just to illustrate the basic configuration of a sine wave as applied to the outer periphery of a tillage disc, coulter, planter blade or the like.

Figure 2:
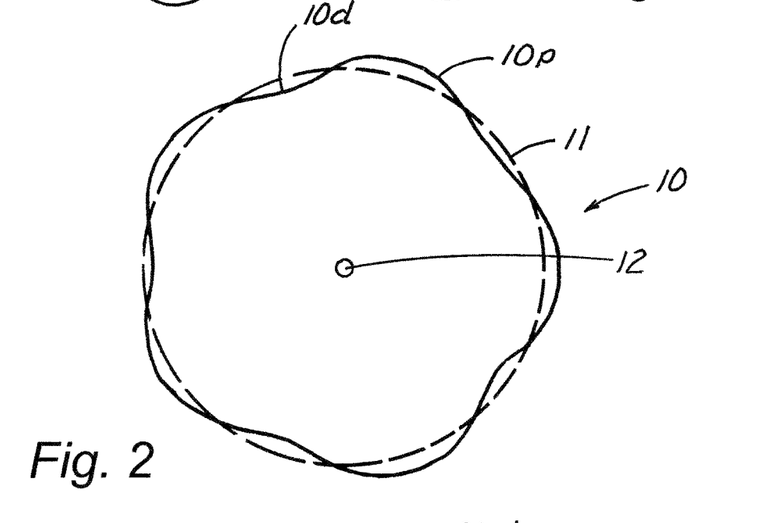
FIG. 2 is a side view of a flat blade having an outer peripheral edge formed in the shape of a sine wave superimposed about a dashed line forming five (5) projections and five (5) depressions in that side view.

Referring now to FIG. 2, a flat agricultural blade or plate 10 has an outer periphery having five (5) projections 10p and an equal number, five (5), depressions 10d formed evenly in the form of a sine wave superimposed onto a circle 11, shown in dashed lines. A center opening 12 is also disposed in the plate 10.

Figure 3:
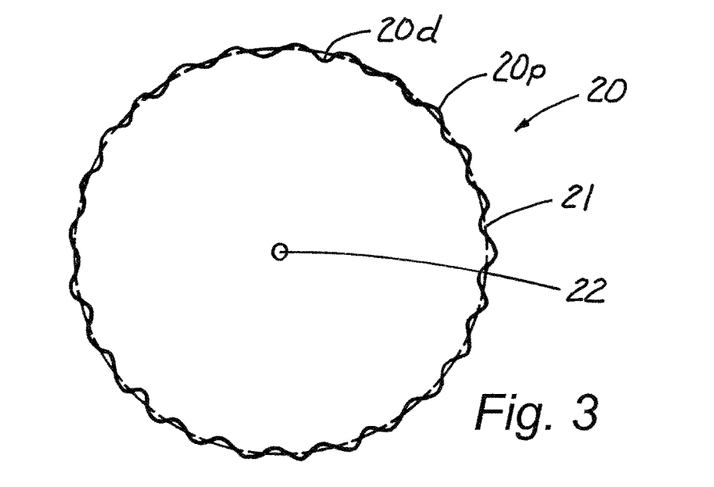
FIG. 3 is a side view of another flat blade having an outer peripheral edge formed in the shape of a sine wave superimposed about a dashed line forming twenty five (25) projections and twenty five (25) depressions.
Figure 21:
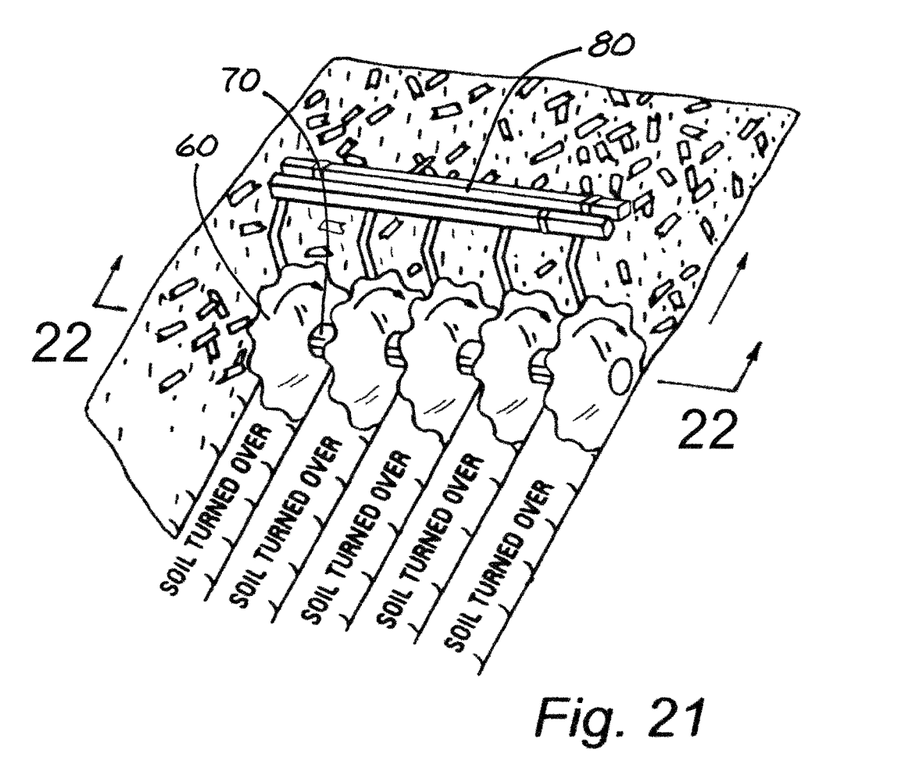
FIG. 21 shows a gang of discs, like the discs of FIGS. 14-19 that rotate independently with respect to each other on a shaft.
Figure 22:
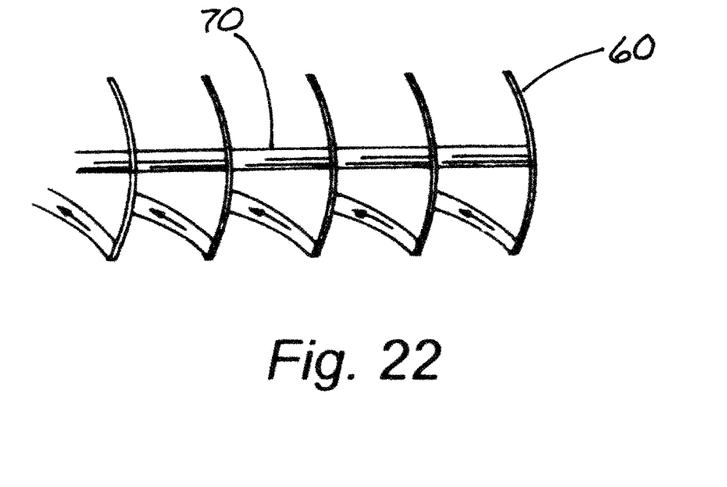
FIG. 22 is a view along line 22 of FIG. 21 showing how the concave/convex discs throw dirt as they rotate through the soil.

FIG. 3 shows a blade 20, which is similar to the blade 10, except that it has twenty five (25) projections 20p and an equal number, twenty five (25), depressions 20d formed evenly in the form of a sine wave superimposed onto a circle 21, shown in dashed lines in FIG. 3. It has been determined that for blades of typical diameters used for agricultural tillage purposes, no fewer than five (5) projections/depressions and no more than twenty five (25) projections/depressions are workable. Fewer than five projections/depressions traps too much trash to be cut in the depressions and more than twenty five projections/depressions is too close to being equivalent to just having a circular blade with no depressions at all. A center opening 22 is disposed in the blade 20 for permitting it to rotate on a shaft, like shaft 70 shown in FIGS. 21 and 22. The blades 20 rotate independently on the shaft and preferably do not rotate with the shaft. The shaft 70 can remain fixed with respect to the tool bar 80 as shown in FIGS. 21 and 22.

Figure 4:
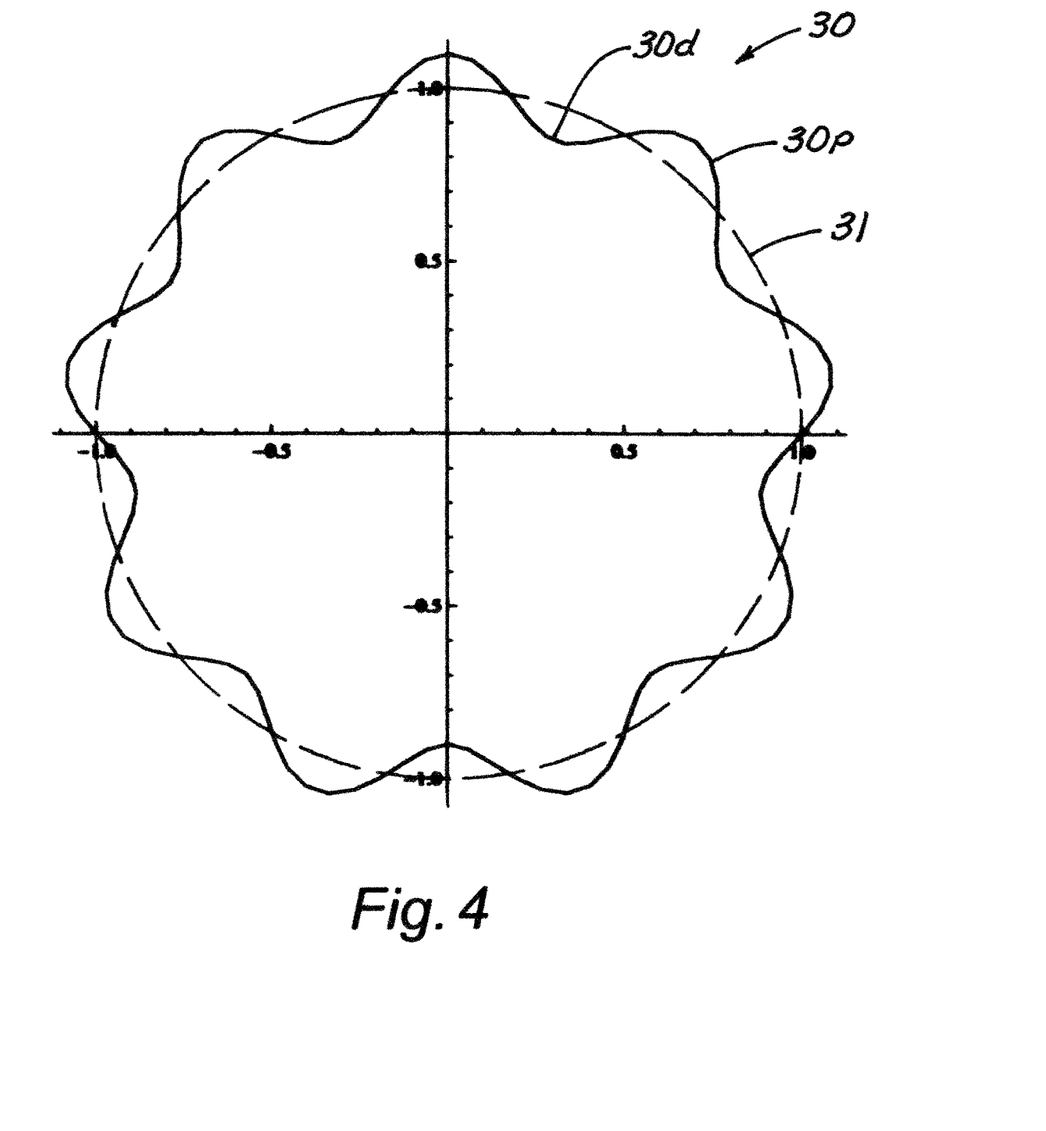
FIG. 4 graphically shows the sine wave curve described mathematically as $r=R+A \sin(T\Theta)$ where r is the radius (distance from the origin) of the outer periphery, R is the average radius (half the average diameter), A is the amplitude of the sine wave superimposed on the circle, and T is an integer (only) dictating the number of full periods of the sine wave appearing around the periphery.

FIG. 4 graphically shows the mathematical function for the outer periphery of the coulter is: $r = R + A \sin(T\Theta)$ where r is the radius (distance from the origin) of the outer periphery, R is the average radius (half the average diameter), A is the amplitude of the sine wave superimposed on the circle, and T is an integer (only) dictating the number of full periods of the sine wave appearing around the periphery. The outer black line that includes projections 30p and depressions 30d, is the wavy outer periphery and the circular dashed line 31 is the average radius. T=was selected to be 9 in this example. In FIG. 4, the disc 30 has nine (9) projections 30p and nine (9) depressions 30d between each projection 30p, the sine wave formed by the outer periphery being formed along a circle represented by dashed line 31.

Figures 5, 7A:
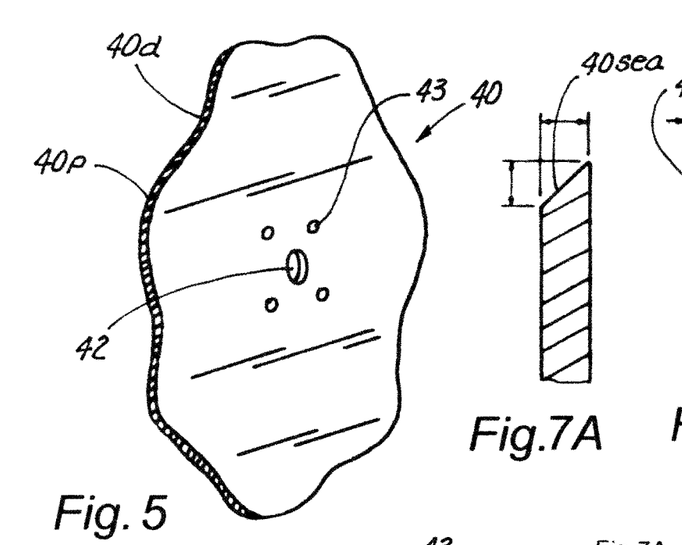
FIG. 5 is a perspective view of a flat blade having seven (7) projections and seven (7) depressions.
FIG. 7A is a cross sectional view of that part of the blade of FIG. 7 shown in the circle labeled "FIG. 7A"
Figures 6, 7:
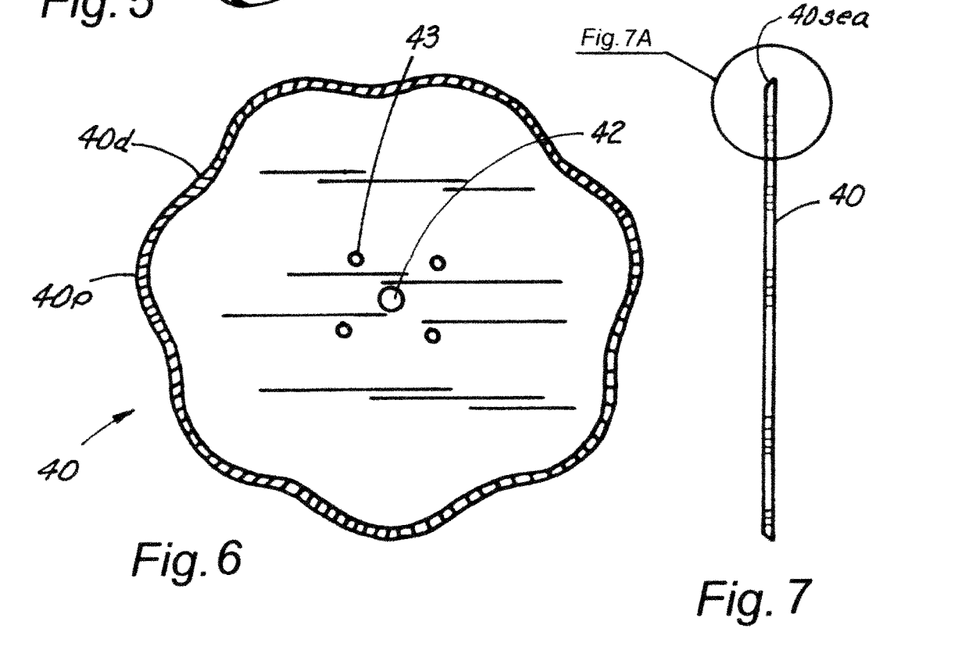
FIG. 6 is a side view of the blade of FIG. 5.
FIG. 7 is an edge view of the blade shown in FIG. 6.

FIGS. 5-7 show a flat agricultural blade or plate 40 which has an outer periphery having seven (7) projections 40p and an equal number, seven (7), depressions 40d formed thereon. A center opening 42 is also disposed in the plate 40, along with optionally four bolt holes 43 for optionally bolting a bearing structure (not shown) onto the blade 40.

Figure 7B:
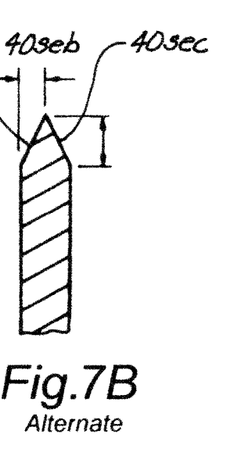
FIG. 7B is a cross sectional view of that part of the blade of FIG. 7 shown in the circle labeled "FIG. 7A" except that it is an alternate sharpened edge.

FIG. 7A shows a cross sectional view of the sharpened edge 40sea that goes completely around the outer periphery of the blade 40. FIG. 7B shows an alternate edge with sharpened edge surfaces 40seb and 40sec that can alternatively be formed on the outer periphery of the blade 40, instead of edge 40sea, if desired.

Figures 8, 9, 10, 10A:
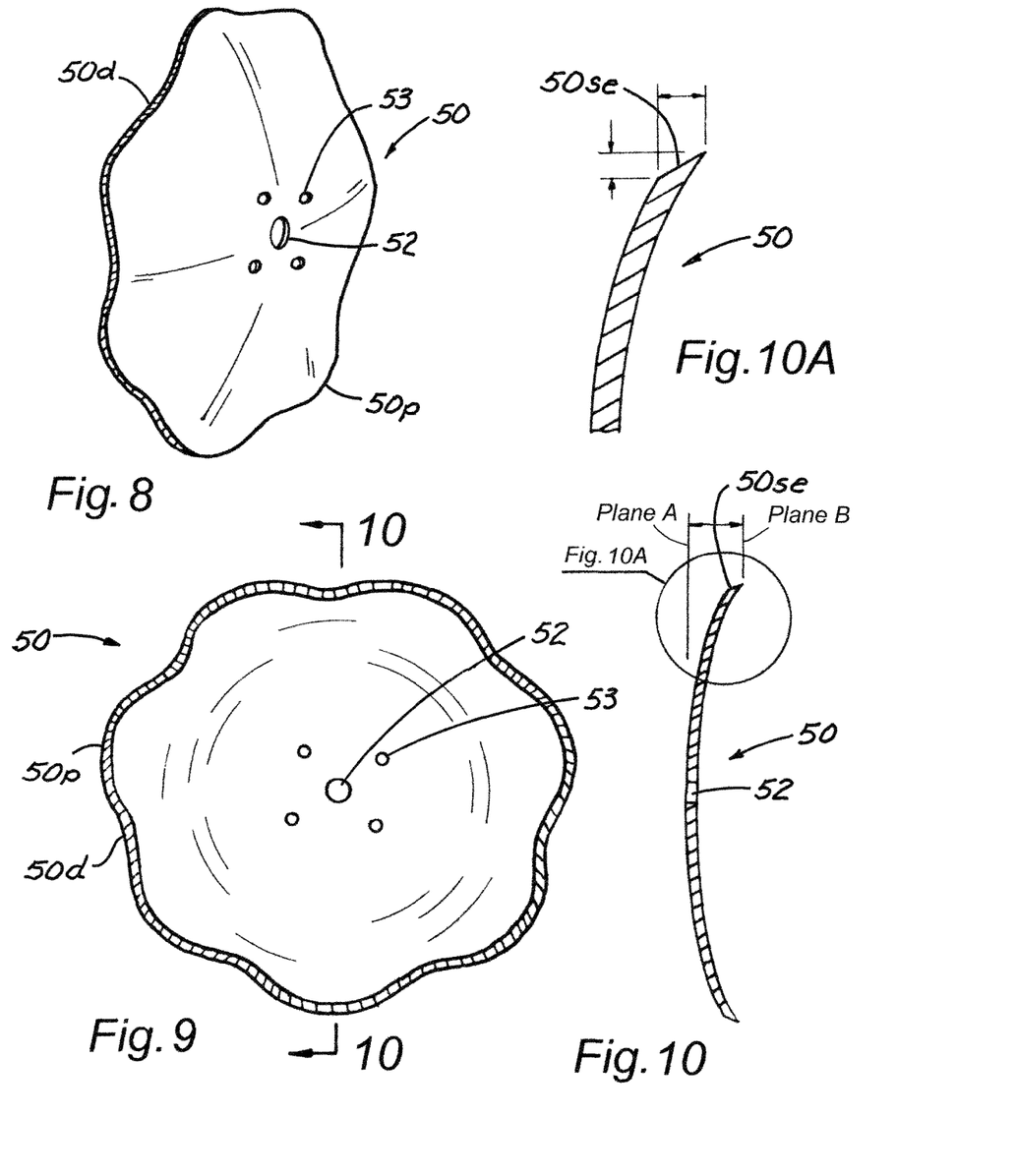
FIG. 8 is a is a perspective view of the convex side of a concave/convex disc blade having seven (7) projections and seven (7) depressions.
FIG. 9 is a side view of the convex side of the disc blade shown in FIG. 8.
FIG. 10 is a cross sectional view of the disc blade of FIG. 9 taken along line 10-10 and showing the central part of the disc blade with the opening in it disposed along plane A and the outermost peripheral edge disposed in plane B.
FIG. 10A is a cross sectional view of that part of the blade of FIG. 10 shown in the circle labeled "FIG. 10A"

FIGS. 8-10 shows the convex side a concave/convex agricultural disc 50 which has an outer periphery having seven (7) projections 50p and an equal number, seven (7), depressions 50d formed thereon. A center opening 52 is also disposed in the plate 50, along with optionally four bolt holes 53 for optionally bolting a bearing structure (not shown) onto the blade 50.

FIG. 10A shows a cross sectional view of the sharpened edge 50*se* that goes completely around the outer periphery of the blade 50. The agricultural tillage blade 50 has radially outermost portions of the sharpened outer periphery of the blade lie generally in a first plane B but the central portion of the disc is disposed at least partially in a second plane A, which second plane A is parallel to but spaced from the first plane B.

Figure 11:
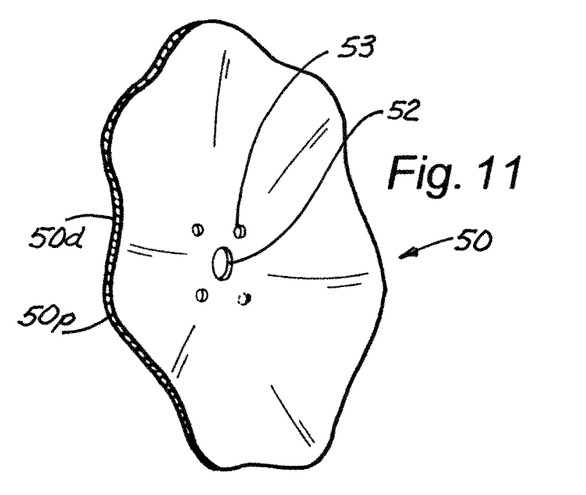
FIG. 11 is a is a perspective view of the concave side of the concave/convex disc blade shown in FIGS. 8-10, having seven (7) projections and seven (7) depressions.
Figure 12:
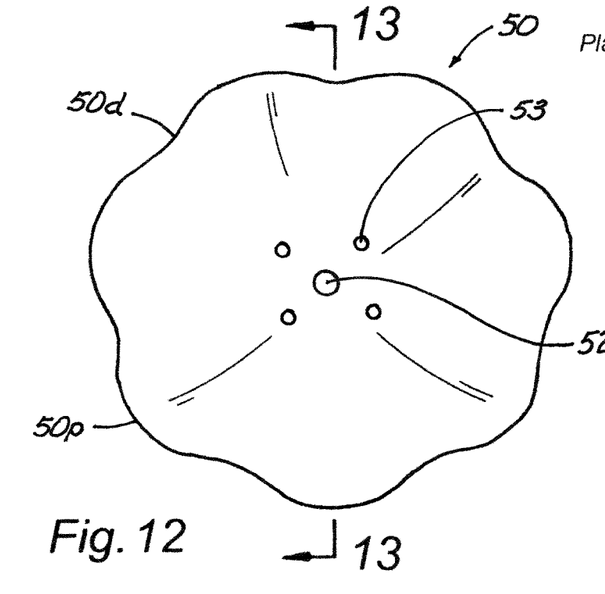
FIG. 12 is a side view of the concave side of the disc blade shown in FIGS. 7-10.
Figure 13:
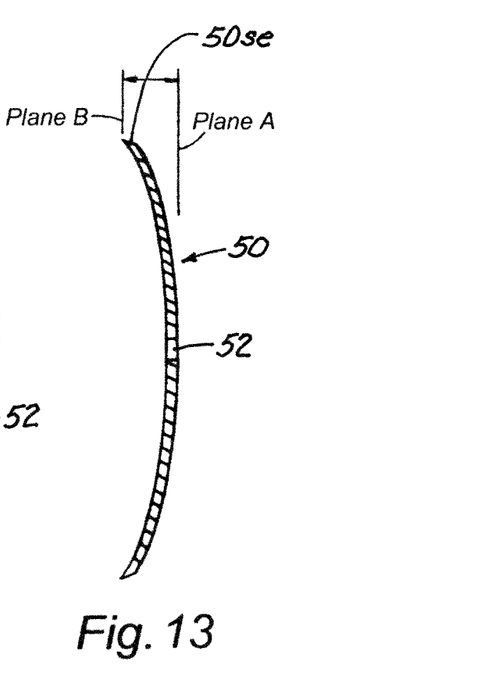
FIG. 13 is a cross sectional view of the disc blade taken along line 13-13 of FIG. 12 and showing the central part of the disc blade with the opening in it disposed along plane A and the outermost peripheral edge disposed in plane B.

FIGS. 11-13 shows the concave side of the concave/convex agricultural disc 50 of FIGS. 8-10. The disc 50 has an outer periphery having seven (7) projections 50*p* and an equal number, seven (7), depressions 50*d* formed thereon. A center opening 52 is also disposed in the plate 50, along with optionally four bolt holes 53 for optionally bolting a bearing structure (not shown) onto the blade 50.

The agricultural tillage blade 50 shown in FIG. 13, as in FIG. 10, has radially outermost portions of the sharpened outer periphery of the blade that lie generally in a first plane B but the central portion of the disc is disposed at least partially in a second plane A, which second plane A is parallel to but spaced from the first plane B. This is generally to be distinguished from flat coulters or flat planer/drill blades.

Figures 14, 15, 16:
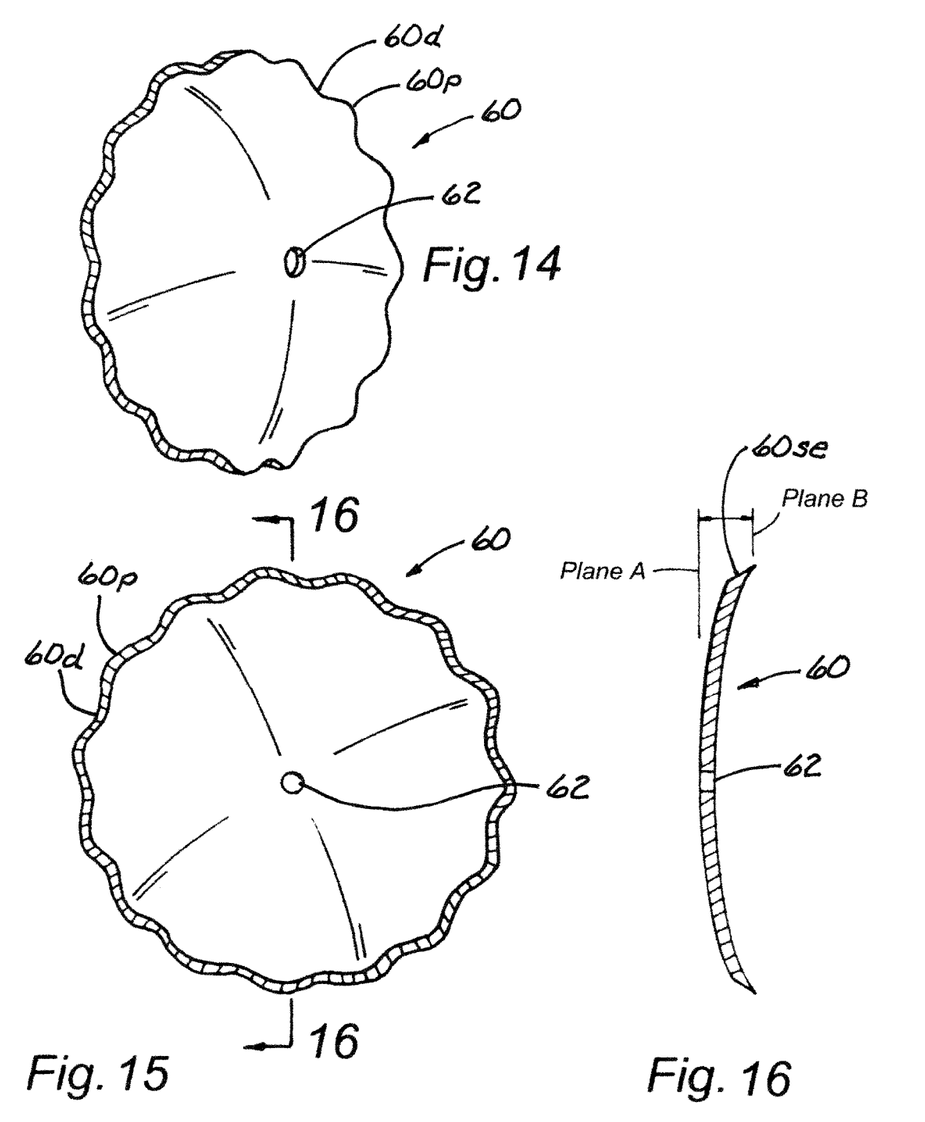
FIG. 14 is a is a perspective view of the convex side of a concave/convex disc blade having fifteen (15) projections and fifteen (15) depressions.
FIG. 15 is a side view of the convex side of the disc blade shown in FIG. 14.
FIG. 16 is a cross sectional view of the disc blade of FIG. 15 taken along line 16-16 of FIG. 15 and showing the central part of the disc blade with the opening in it disposed along plane A and the outermost peripheral edge disposed in plane B.

FIGS. 14-16 shows the convex side a concave/convex agricultural disc 60 which has an outer periphery having fifteen (15) projections 60*p* and an equal number, fifteen (15), depressions 60*d* formed thereon. A center opening 62 is also disposed in the plate 60.

Figure 17:
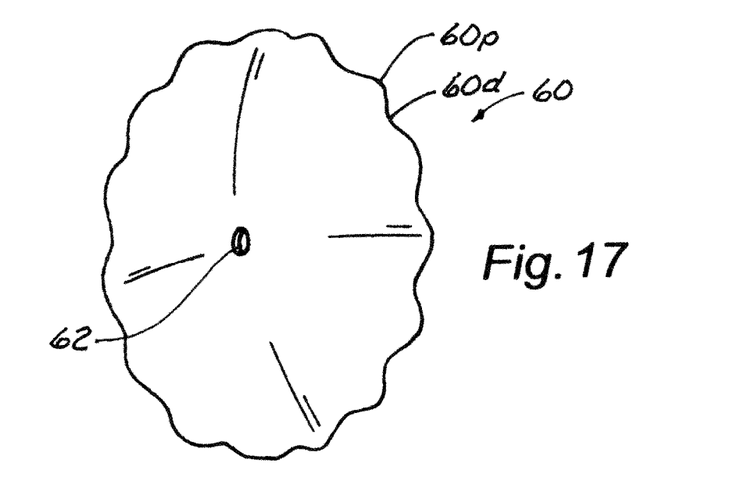
FIG. 17 is a is a perspective view of the concave side of the concave/convex disc blade shown in FIGS. 14-16, having fifteen (15) projections and fifteen (15) depressions.
Figures 18, 19:
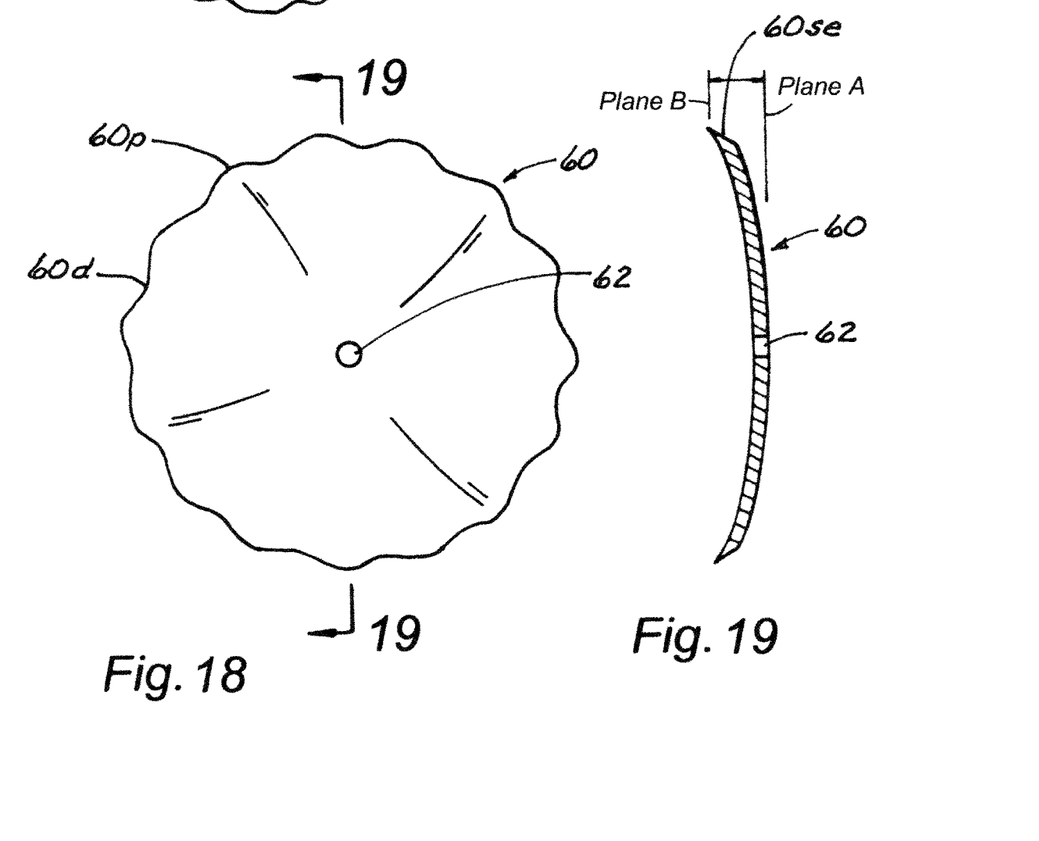
FIG. 18 is a side view of the concave side of the disc blade shown in FIGS. 14-17.
FIG. 19 is a cross sectional view of the disc blade taken along line 19-19 of FIG. 18 and showing the central part of the disc blade with the opening in it disposed along plane A and the outermost peripheral edge disposed in plane B.

FIGS. 17-19 show the concave side of the concave/convex agricultural disc 60 of FIGS. 14-16. The disc 60 has an outer periphery having fifteen (15) projections 60*p* and an equal number, fifteen (15), depressions 60*d* formed thereon. A center opening 62 is also disposed in the plate 60. FIGS. 16 and 19 show a sharpened edge 60*se* that goes continuously around the outer periphery of the disc 60, continuously through all projections 60*p* and all depressions 60*d*.

Figure 20:
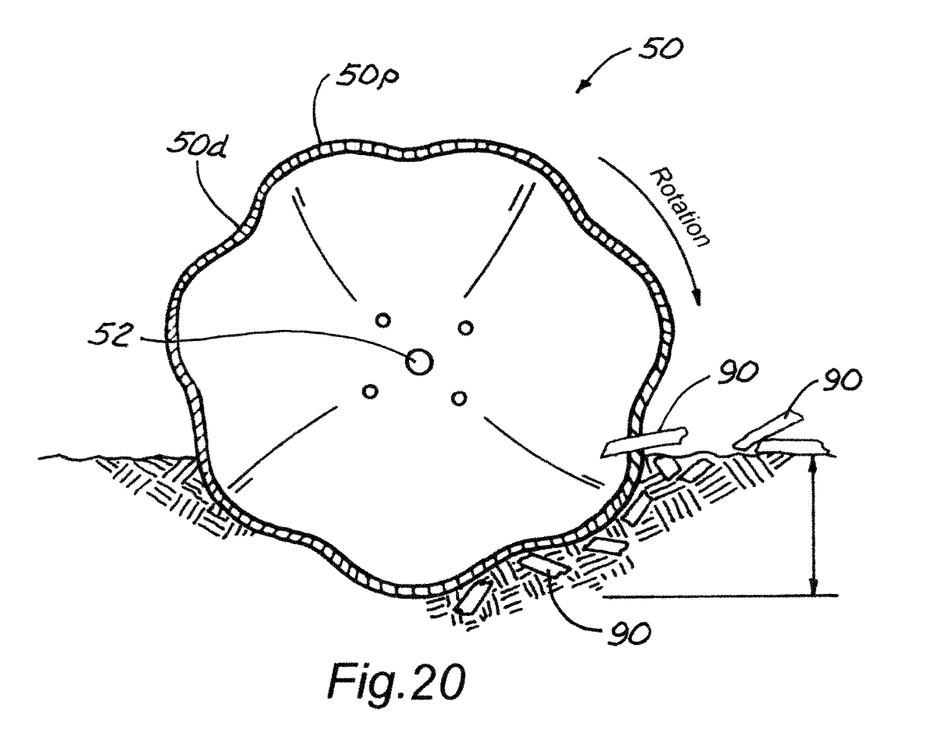
FIG. 20 is a partial cross sectional view of the concave side of the concave/convex disc of FIGS. 8-13 rotating in a clockwise direction, penetrating the soil, trapping trash such as corn stalks in the depressions on the outer periphery and cutting the corn stalks while, due to the concave/convex shape, throwing some soil in a direction away from the side being viewed in FIG. 20, on the concave side of the blade.

FIG. 20 is a partial cross sectional view of the concave side of the concave/convex disc of FIGS. 8-13 rotating in a clockwise direction, penetrating the soil, trapping trash such as corn stalks 90 in the depressions on the outer periphery and cutting the corn stalks 90 while at the same time, due to the concave/convex shape, throwing some soil in a direction away from the side being viewed in FIG. 20, on the concave side of the blade. FIG. 20 shows the disc 50 moving through the soil to cut trash such as cornstalks 90 that become trapped in the depressions 50*d* between adjacent projections 50*p* as the disc 50 rotates clockwise in the example shown in FIG. 23. By having a minimum of five or a maximum of twenty five projections/depressions, this trapping of the trash between projections and then cutting the trash as the depression part of the blade pushes against the trash/cornstalk 90 as it goes into the ground does a much better job of cutting the trash than prior art blades. The projections, like 50*p*, penetrate the soil farther than prior art blades and better facilitate the trapping of the trash such as cornstalks 90 in the depressions, like depression 50*d*. A blade that has both better soil penetration and better cutting of the trash is a major advantage of the present invention.

FIGS. 21 and 22 show a gang of discs, like the discs 60 of FIGS. 14-19, that rotate independently on a shaft 70. This is fundamentally different than the gangs of discs shown in U.S. Pat. No. 5,495,897 to Javerlhac, which discs are attached to a rotating shaft and are intentionally mounted sequentially out of phase to throw the soil to the next adjacent blade, etc.

The unnumbered arrows in FIG. 22 show the direction of the soil and trash being thrown in a direction away from the concave side of the discs 60. The thrown dirt can also be seen in FIG. 21 where it says "soil turned over". The amount of concavity of the discs 60 and the orientation of the shaft 70 with respect to the forward direction of the tool bar 80 determine how much or how little of the dirt or soil is thrown by the discs 60. The current practice in minimum tillage agriculture is to turn only a small amount of soil, only enough to place some dirt over the trash that has been cut. The trash will deteriorate and rot quicker if some soil is over it and that is a desired condition. If there is no dirt over the trash, such as corn stalks, then the trash will dry out quickly and not rot and turn back into desirable components of the soil as quickly as is desireable.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims.

I claim:

1. An agricultural tillage blade comprising:
   a plate adapted for rotation;
   the plate having a front side and a rear side, and having an outer periphery substantially in the shape of a sine curve formed about a circle;
   the outer periphery being sharpened to more easily penetrate the soil and cut trash; and
   wherein the blade has depressions between projections when viewed from the front side, the depressions and projections being mirror images of each other.

2. The agricultural tillage blade of claim 1 wherein the plate is exactly in the shape of a sine curve formed about a circle.

3. The agricultural tillage blade of claim 1 wherein the blade is flat except for the sharpened edge.

4. The agricultural tillage blade of claim 1 wherein the blade has no fewer than five (5) projections and no more than twenty five (25) projections on the blade.

5. The agricultural tillage blade of claim 1 wherein the outer periphery of the plate is generally defined by the formula $r = R + A\sin(T\Theta)$ where $r$ is the radius (distance from the origin) of the outer periphery, $R$ is the average radius, $A$ is the amplitude of the sine wave superimposed on the circle, $T$ is an integer dictating the number of full periods of the sine wave appearing around the periphery, and $\Theta$ is a central angle whose vertex is at the origin.

6. The agricultural tillage blade of claim 1 wherein all of the radially outermost portions of the sharpened outer periphery of the blade lie generally in a first plane.

7. The agricultural tillage blade of claim 1 wherein, at any constant, radius between a center of the plate to the sharpened edge, the front side of said blade lies in a single plane.

8. The agricultural tillage blade of claim 7 wherein, at any constant, radius between a center of the plate to the sharpened edge, the rear side of said blade lies in a single plane.

9. The agricultural tillage blade of claim 1 wherein, at any constant, arbitrary radius measured from a center of the plate to the sharpened edge, the rear side of said blade lies in a single plane.

10. The agricultural tillage blade of claim 1 wherein the front side is disposed entirely in the front plane and the rear side being disposed entirely in the rear plane.

11. The agricultural tillage blade of claim 1 wherein the plate includes a central opening adapted to receive a shaft for rotation.

12. An agricultural tillage blade comprising:
a plate adapted for rotation;
the plate having a front side and a rear side, and having an outer periphery substantially in the shape of a sine curve formed about a circle;
the outer periphery of the plate is generally defined by the formula r=R+A sine(TΘ) where r is the radius (distance from the origin) of the outer periphery, R is the average radius, A is the amplitude of the sine wave superimposed on the circle, T is an integer dictating the number of full periods of the sine wave appearing around the periphery, and Θ is a central angle whose vertex is at the origin;
the entire outer periphery being sharpened to more easily penetrate the soil and cut trash; and
wherein the blade has depressions between projections when viewed from the front side, the depressions and projections being mirror images of each other.

13. The agricultural tillage blade of claim 12 wherein the blade is substantially flat except for the sharpened edge.

14. The agricultural tillage blade of claim 12 wherein the blade has depressions between projections when viewed from the side, there being no less than five (5) projections and no more than twenty five (25) projections on the blade.

15. The agricultural tillage blade of claim 12 wherein all of the radially outermost portions of the sharpened outer periphery of the blade lie generally in a first plane.

16. The agricultural tillage blade of claim 12 wherein the front side is disposed entirely in the front plane and the rear side being disposed entirely in the rear plane.

17. The agricultural tillage blade of claim 12 wherein the plate includes a central opening adapted to receive a shaft for rotation.

18. An agricultural tillage blade comprising:
a plate adapted for rotation;
the plate having an outer periphery substantially in the shape of a sine curve formed about a circle, the circle defining an average radius reference line, wherein projections extend radially outwardly from the reference line and depressions extend radially inwardly from the reference line in a regular symmetrical repeating pattern, wherein the projections and depressions are mirror images of each other;
the outer periphery being sharpened to more easily penetrate the soil and cut trash; and
each of the projections has a projection width along the reference line and a projection height above the reference line, and each of the depressions has a depression width along the reference line and a depression depth below the reference line, and wherein the projection width is identical to the depression width, and the projection height is identical to the depression depth.

19. The agricultural tillage blade of claim 18 wherein the front side is disposed entirely in the front plane and the rear side being disposed entirely in the rear plane.

20. The agricultural tillage blade of claim 18 wherein the plate includes a central opening adapted to receive a shaft for rotation.

21. An agricultural tillage blade comprising:
a plate adapted for rotation;
the plate having an outer periphery substantially in the shape of a sine curve formed about a circle, the circle defining an average radius reference line, wherein projections extend radially outwardly from the reference line and depressions extend radially inwardly from the reference line in a regular symmetrical repeating pattern, wherein the projections and depressions are mirror images of each other;
the outer periphery of the plate is generally defined by the formula r=R+A sine(TΘ) where r is the radius (distance from the origin) of the outer periphery, R is the average radius, A is the amplitude of the sine wave superimposed on the circle, T is an integer dictating the number of full periods of the sine wave appearing around the periphery, and Θ is a central angle whose vertex is at the origin;
the entire outer periphery being sharpened to more easily penetrate the soil and cut trash; and
each of the projections has a projection width along the reference line and a projection height above the reference line, and each of the depressions has a depression width along the reference line and a depression depth below the reference line, and wherein the projection width is identical to the depression width, and the projection height is identical to the depression depth.

22. The agricultural tillage blade of claim 21 wherein the front side is disposed entirely in the front plane and the rear side being disposed entirely in the rear plane.

23. The agricultural tillage blade of claim 21 wherein the plate includes a central opening adapted to receive a shaft for rotation.

24. An agricultural tillage blade comprising:
a plate adapted for rotation;
the plate having a front side and a rear side, and having an outer periphery substantially in the shape of a sine curve formed about a circle;
the outer periphery being sharpened to more easily penetrate the soil and cut trash;
wherein the blade has depressions between projections when viewed from the front side, the depressions and projections being mirror images of each other; and
the blade being convex on the front side and concave on the rear side.

25. The agricultural tillage blade of claim 24 wherein the front, convex, side is disposed entirely in a continuous arc of a fixed radius from the sharpened outer periphery radially inwardly to a plate center and the rear, concave, side being disposed entirely in a second continuous arc, spaced from the first continuous arc, from the sharpened outer periphery radially inwardly to the plate center.

26. The agricultural tillage blade of claim 24 wherein the plate includes a central opening adapted to receive a shaft for rotation.

* * * * *